United States Patent [19]

Brotzmann

[11] Patent Number: 5,401,295
[45] Date of Patent: Mar. 28, 1995

[54] SMELTING REDUCTION METHOD WITH HIGH PRODUCTIVITY

[75] Inventor: Karl Brotzmann, Amberg, Germany

[73] Assignee: Technological Resources Pty. Ltd., Melbourne, Australia

[21] Appl. No.: 25,651

[22] Filed: Mar. 3, 1993

[30] Foreign Application Priority Data

Mar. 4, 1992 [DE] Germany .................. 42 06 828.2

[51] Int. Cl.$^6$ .............................................. C21B 13/14
[52] U.S. Cl. ........................................ 75/500; 75/446
[58] Field of Search ................................. 75/446, 500

[56] References Cited

U.S. PATENT DOCUMENTS 5,198,019  3/1993  Dry et al. .............................. 75/500

FOREIGN PATENT DOCUMENTS

0217331B1  4/1987  European Pat. Off. .
2401909A1  7/1975  Germany .
2428715A1  12/1975  Germany .
2715736A1  10/1977  Germany .
2807034A1  8/1978  Germany .
3905058C1  7/1990  Germany .

*Primary Examiner*—Melvyn J. Andrews
*Attorney, Agent, or Firm*—Nikaido, Marmelstein, Murray & Oram

[57] ABSTRACT

The invention relates to a method for smelting reduction of metal ores involving a combination process wherein the metal ores are partly reduced in one or more stages and then completely reduced to metal in a melt-down reactor. The combination process comprises at least three process units, and the melt-down reactor forms one process unit. The partial reduction of the metal ores is performed in at least two further process units. A different waste gas is produced in each of these at least three process units.

16 Claims, 1 Drawing Sheet

SMELTING REDUCTION METHOD WITH HIGH PRODUCTIVITY

FIELD OF THE INVENTION

The present invention relates to a method for smelting reduction of metal ores involving a combination process wherein the metal ores are partly reduced in one or more stages and then completely reduced to metal in a smelting reactor.

BACKGROUND OF THE INVENTION

It is not new to reduce metal-oxygen compounds, preferably metal ores, in a molten bath and to supply the necessary energy to the smelt by carbonaceous fuels and oxygenous gases, and there are a number of protective rights and prior publications which deal with smelting reduction.

In steelmaking by the various air refining methods there were already efforts to reduce ores with carbon in a converter. The oxygen content of the blowing medium serves, among other things, to produce the necessary heat by oxidizing part of the carbon. German patent no. 605 975, from 1932, describes a method wherein the blowing medium and the carbon are separated from each other and supplied alternatingly to the smelt and, interestingly, the carbon was added in the form of a carbonaceous gas. This is also indicated by the claim with the following wording: "A method for making steel in converters or in air furnaces provided with tuyères wherein ores are reduced in an iron sump and the carbon is added, carried by an oxygenous blowing medium, characterized in that air or oxygen-enriched air or pure oxygen and neutral gases or gases which release carbon themselves or have a reducing effect are alternatingly used as a blowing medium and carbon carrier."

An essential contribution to economical operation of the reduction of metal ores in a molten metal bath was made by afterburning the reaction gases, mainly CO and $H_2$, in the gas space above the molten bath and recycling the resulting heat to the molten bath. The teachings on this afterburning of the reaction gases and the successful retransfer of the heat to the molten bath are described for the first time by the worldwide protected method for improving the thermal balance during steel finery, for instance U.S. Pat. No. 4,195,985. This patent print also states in col. 14, line 39, the use of iron ore instead of scrap as a coolant during steelmaking. A particularly advantageous form of this method and its further development to achieve higher afterburning rates and a special apparatus are set down in the internationally protected method and the apparatus for afterburning reaction gases, for instance in U.S. Pat. No. 5,052,918.

A well thought-out method for making iron/crude steel with a carbon content of 2 to 3% is described in German patent no. 33 18 005. In this process approx. 70 t crude steel are produced per hour in a melt-down vessel containing an iron smelt of approx. 120 t. The method is a combination system involving a melt-down reactor, a gas conditioning vessel and a shaft furnace for preducing the ores. This method for making iron from ore is characterized in that the reaction gases emerging from the iron smelt are partly afterburned in the melt-down vessel whereby the resulting heat is largely transferred to the smelt and the reaction gases are cooled and reduced with reduction agents on the way to the ore reduction vessel. This process is characterized not only by the stated productivity but also by a comparatively small amount of recycle gas of 80,000 $Nm^3/h$ with which 110 t iron ore are reduced to a degree of metalization of approx. 75%, and the gas then leaves the shaft furnace with a composition of approx CO 41%, $CO_2$ 30%, $H_2$ 23%, $H_2O$ 1%, $N_2$ 4%, to be subsequently used as a service gas, for example for heating purposes.

The hitherto described prior art clearly indicates steps which substantially contribute to an economical operation of a smelting reduction method. For example, whereas the basic considerations on the reduction of iron ores in steelmaking were set forth a relatively long time ago, the last-mentioned process describes in its examples the practical application of smelting reduction with production data and gas compositions and amounts. By contrast, many newly granted protective rights for smelting reduction contain only a row of known steps and no quantitative data on the quantity and materials balance of these processes. A random example of this is U.S. Pat. No. 4,985,068 whose main claim reads as follows: "A method for smelting reduction of iron oxide, comprising (a) feeding prereduced iron oxide into an enclosed smelter; (b) heating, melting and reducing said iron oxide to molten metal by combusting a surplus of natural gas with oxygen, carburizing the molten metal by dissolving dissociated carbon in the metal, and forming a reacted off-gas; (c) introducing hot air into the enclosed smelter above the molten bath and oxidizing a portion of the off-gas to produce a flue gas; (d) cleaning and cooling flue gas to a temperature of from about 800° C. to 950° C.; (e) contacting said iron oxide with said cleaned flue gas to perform the prereducing function; and (f) drawing off molten iron product."

At the European Ironmaking Conference in Glasgow in September 1991 the authors Cusack/Hardie/Burke presented an extensive report on the development of smelting reduction in their contribution "HIsmelt—Second Generation Direct Smelting," and this publication indicates a number of important process parameters and their mutual relations. It deals with the degree of prereduction of the ores as a function of the degree of afterburning of the reaction gases and the resulting coal required for ironmaking, as well as the stages of development of the smelting reduction methods known from industry and their essential characteristics. It states a simplified materials and thermal balance for the HIsmelt process, and mentions for the demonstration plant under construction a production capacity of 14 t pig iron per hour or 100,000 t per year.

Some common disadvantages are also indicated by the many prior publications on smelting reduction of metal ores and the combination of an ore prereduction stage with a melt-down vessel, and by the details known about the pilot plants and production facilities on this basis. The known production capacity, i.e. the metal production per unit of time, is relatively low. Limits probably result from the high energy turnovers in the melt-down reactor. It is also striking that, although there are differences in the amounts of gas to be removed from the process and their residual energy contents, considerable amounts of gas with relatively high thermal values must in any case be removed from the process. This even holds for methods wherein the partly afterburned gases from the melt-down vessel are utilized for prereducing ore with a relatively low degree of metalization. The economy of this processes remains contingent on the profits made in selling the surplus amounts of gas.

SUMMARY OF THE INVENTION

The present invention is accordingly based on the problem of providing a method which makes it possible in an economical way to clearly increase productivity in the melt-down vessel of a smelting reduction plant, i.e. to produce a very much greater amount of liquid metal per unit of time, based on the weight of the molten bath in the melt-down reactor, in comparison to known methods and to improve the utilization of the gas in the total process. The inventive problem is thus aimed at improving the economy in metal production by the smelting reduction method.

This problem is solved according to the invention if the combination process comprises at least three process units and the melt-down reactor forms one process unit while the partial reduction of the metal ores is performed in at least two further process units, a different waste gas is produced in each of these at least three process units, and the waste gas from the melt-down reactor is guided only through one process unit for partial reduction.

The object of the invention is accordingly a method for smelting reduction of metal ores involving a combination process wherein the metal ores are partly reduced in several stages and then completely reduced to metal in a melt-down reactor, the combination process comprising at least three process units and the melt-down reactor forming one process unit while the partial reduction of the metal ores is performed in at least two further process units, and a different waste gas being produced in each of these at least three process units, characterized in that partly reduced ore from the partial reduction facility, process unit C, is passed into the smelt of the melt-down reactor, process unit A, and the afterburned waste gas from process unit A is passed into the initial reduction facility of process unit B where it is fully burned and removed from the combination process.

The inventive method has made it possible in an unforeseeable way to increase the production of molten bath in the melt-down reactor of a smelting reduction plant constructed as a combination process from several process units to approximately twice that in smelting reduction plants. Furthermore, the inventive method has made it possible to reduce the coal consumption for the production of 1 t molten bath by more than 10% compared to known processes. This fuel saving is probably due to the surprisingly high degree of afterburning of the reaction gases in the melt-down reactor and the simultaneous good heat retransfer of the energy arising during gas afterburning to the molten metal bath.

In all hitherto known smelting reduction methods in combination with ore prereduction, the reaction gases from the melt-down vessel are used to prereduce the metal ores. One can work either with or without a relatively low after-burning of the reaction gases in the melt-down vessel in order to provide an applicable reducing gas for the metal ores during their prereduction. At a higher degree of afterburning in the melt-down vessel the waste gases must be conditioned suitably to improve their reduction potential. The gas conditioning facilities used for this purpose are elaborate and require the gases to be cooled for $CO_2$ washing. The purified gas must then be heated again to the favorable reduction temperature for the metal ores. As for the also known, direct reduction of the waste gases from the melt-down reactor on the way to the ore reduction vessel with corresponding reduction agents, such as carbon and natural gas, there are also hitherto difficulties with the operating reliability and reproducibility of this method step.

The method according to the invention opens up a completely new way here, which ultimately leads to the surprisingly favorable results. The starting point is a combination process for smelting reduction of metal ores which consists of a plurality, but at least three, process units. The term "process unit" is deliberately selected here as opposed to a customary method step in order to make it clear that these units constitute relatively independent facilities, which can be of varying design, in the total combination process. One must merely coordinate the process engineering design data of the individual process units to ensure a uniform flow of material for the inventive combination process. For example, each of the at least two partial reduction units can be of multistage design. One can use, among other things, a multistage circulating fluid bed for one or both of the process units for the partial reduction of the metal ores.

The inventive method is particularly suitable for reducing iron ore and iron-containing ores. But it is suitable in general for ores, dusts and similar materials containing oxides of one or more transition metals, in particular those of vanadium, chromium, manganese, iron, cobalt, nickel, copper, zinc and lead, preferably those with mainly iron.

An advantageous design of the inventive combination process for smelting reduction of metal ores can consist of three process units, whereby process unit A is the melt-down reactor. The waste gases from the melt-down reactor have a high degree of afterburning and directly reach process unit B, a preheating and initial reduction facility for the metal ores. The waste gases from this process unit B are fully burned, and their physical residual heat can be utilized for example directly or via a heat exchanger for heating purposes. The metal ores heated and possibly somewhat reduced in process unit B are supplied to the third process unit C, the actual partial reduction facility, and prereduced there to a clearly higher degree of metalization and then supplied to process unit A, the melt-down reactor.

With the method according to the invention, waste-gas streams differing in their amounts, their gas compositions and their thermal values arise in the three different process units. In the following the gas composition will be expressed by the degree of afterburning, which is an important characteristic for the assessment of the overall method, the combination process, and the individual process units. The degree of afterburning in percent is defined as follows:

$$AB = \frac{CO_2 + H_2O}{CO_2 + H_2O + CO + H_2} \times 100\%$$

Gas constituents [vol. %] AB=degree of afterburning [%]

Since virtually only CO and $H_2$ emerge from the molten metal bath as reaction gases in the melt-down reactor and are then afterburned with oxygen or air in the gas space thereabove, the waste gas for each process unit is composed only (apart from small impurities) of the components CO, $H_2$, $CO_2$, $H_2O$ and the constituent $N_2$ from the afterburning air. For example, the gas composition 16.3% CO, 10.0% $CO_2$, 3.59% $H_2$, 9.89% $H_2O$ and 60.23% $N_2$ has a degree of afterburning of 50% according to the definition. In the further description this statement on the degree of afterburning will also hold as the implicit quantity for the gas composition.

With the stated advantageous design of the inventive combination process for smelting reduction of metal ores, approximately the following waste-gas streams arise in the individual process units for the production of 1 t iron smelt with approx. 3.5% carbon from a high-quality iron ore. From the melt-down reactor, process unit A, approx. 2000 $Nm^3$ with a temperature of 1680° C. and a degree of afterburning of 60% flow into the preheating and initial reduction facility, process unit B. The waste-gas stream from this process unit is approx. 2600 $Nm^3$ with a temperature of approx. 900° C. and is fully burned, i.e. the degree of afterburning is 100%. In process unit C, i.e. the partial reduction facility, a reducing gas is selectively produced from coal and an oxidizing gas, mainly hot air, and what leaves this facility is approx. 825 $Nm^3$ of a high-quality combustion gas with a temperature of 950° C., a degree of afterburning of 30% and a thermal value of 1.2 $Mcal/Nm^3$. This gas can be utilized in any way, e.g. for producing hot air.

The individual facilities or process units in the combination of which the inventive smelting reduction method takes place can be built and designed, for example, as follows. The melt-down reactor, process unit A, can be an inclined drum vessel having feed tuyères encased with protective medium below the bath surface, supply means for various solids and one or more top blowing tuyères for oxygen or oxygenous gases for afterburning the reaction gases in the upper reactor space. Proven underbath tuyères are the customary constructions consisting of two concentric pipes, and circular slot tuyères, as described for example by German patent no. 24 38 142, as well as simple pipes for supplying additional circulation gas, for example to increase the bath motion in limited areas of the melt-down reactor. It is also within the scope of the invention to supply circulation and reaction gases to the slag zone of the vessel. The tuyères are of course then installed higher in the side wall or in a corresponding supply level of the vessel or its lining. To supply the afterburning oxygen in the gas space of the melt-down reactor one can use, firstly, several simple pipes or, secondly, so-called block tuyères wherein shower-like gas jets emerge from a metal block having several channels, or, preferably, top blowing tuyères according to U.S. Pat. No. 5,051,127. The oxygenous gases used for afterburning may be pure oxygen, air or oxygen-enriched air and preferably hot air, i.e. preheated air, with or without added oxygen.

All solids can be introduced both below the bath surface and onto the bath surface. It is preferable to introduce the solids, depending on their composition, grain size and temperature, into the smelt both below the bath surface and through the top blowing tuyères or special supply pipes within the top blowing tuyères. For example, it is frequently the case that the separated dust from the various parts of the plant is recirculated into the smelt through bottom tuyères. Coal, usually only partial amounts of the total amount required, and ore, in some cases also the preheated, partly reduced ores, are simultaneously blown through the bottom tuyères into the melt-down reactor. However, the prereduced hot ore is usually guided directly from process unit C into the melt-down reactor from above.

In the method according to the invention the waste gas from the melt-down reactor, process unit A, flows into the preheating facility, process unit B. The plant type of this process unit is not fixed. For example, it can be a rotary tubular furnace, a shaft furnace or a normal fluid bed. A circulating fluid bed has proved to be advantageous. In this circulating fluid bed the waste gases from the melt-down reactor are fully burned with oxygen or air, but preferably with hot air. Beforehand, however, the reduction potential of the waste gases is utilized to prereduce the metal ores, and the latter are furthermore dried and heated by the introduced heat. Limestone can be additionally deacidified in this circulating fluid bed in order to use the resulting quicklime for instance as a slag forming agent in the melt-down gasifier. Further loading materials, in particular the slag forming agents, can also be heated and possibly calcined here. The further surplus energy from the afterburning of the waste gases serves to generate steam in the known cooling elements of a circulating fluid bed. The waste gas leaves this process unit B fully burned and with a temperature of approx. 900° C. The preheated ores normally leave the circulating fluid bed with a degree of prereduction of 10 to 30%, but it is also within the scope of the invention only to dry and heat the ores in process unit B, to supply them to the actual partial reduction facility, process unit C, with a very low degree of prereduction or even no prereduction at all.

According to the invention the partial reduction facility, process unit C, is a circulating fluid bed. As is generally known, a circulating fluid bed substantially comprises, regarded downstream, a mixing chamber, a riser pipe and a cyclone with a solids return pipe to the mixing chamber. With such a fluid bed reactor, for example of the Fluxflow type, the charge is fed to the mixing chamber, and the riser pipe contains the cooling systems, mainly heat exchangers, in which steam can also be produced. Along with the slightly prereduced ores with a temperature of about 900° C. and the slag forming agents from the preheating and initial reduction facility, process unit C is also charged with coal and the oxygen necessary for combustion, preferably in the form of hot air. The solids, preferably in a grained or ground form, are supplied to the partial reduction facility pneumatically together with the customary amount of carrier gas.

According to the invention, the amount of supplied coal is greater than can be burned in process unit C by the amount of introduced oxidizing gas in order to produce the desired high-quality reducing gas. This surplus coal is liberated from its volatile components in the partial reduction facility, and the thus produced coke passes together with the prereduced ore, which usually has a degree of metalization in the range of about 50%, and the slag forming agents from process unit C into the melt-down reactor, process unit A, thereby closing the circulation of material in this combination process.

The circulating fluid bed and its operation with the selective partial reduction of the metal ores and the controlled production of a valuable waste gas with a high energy content constitutes an essential feature of the inventive method for smelting reduction of metal ores. This process unit offers the possibility of optimally adjusting both the reducing gas itself and the degree of prereduction of the ores independently of the degree of afterburning of the reaction gases in the melt-down reactor and the further utilization of its waste gases. Not only the quantitative proportion of coal and combustion oxygen but also the sojourn time of the ores in this circulating fluid bed and the amount of the pneumatic conveying gas or an additional inert gas can be used to adjust the degree of metalization of the metal ores from 30% to 70%, preferably from 35% to 65%.

Due to the additional production of coke via the liberation of the introduced coal from its volatile components in the circulating fluid bed, the inventive method also offers a particularly economical supply of the melt-down reactor with carbon as a heating medium. For example, approximately half the added amount of coal in the partial reduction facility is supplied to the melt-down reactor as coke together with the partly reduced metal ore having a degree of metalization of approx. 55% and a temperature of 950° C. Under these conditions it is possible, surprisingly, to approximately double the pig iron production in the same melt-down reactor, i.e. with the same weight of charge and the same geometrical dimensions, over known methods. This increase in productivity in a melt-down reactor offers not only the economic advantages already shown, e.g. the calcination of the slag forming agents and coke production, but also other economic improvements mainly because the costs for the refractory vessel lining, thermal losses of the facilities and general operating and staff costs do not increase in proportion with the pig iron production.

With the hitherto known methods for smelting reduction of iron ores the production rate in tons per hour, based on the average weight of charge in the melt-down vessel—referred to in the following as the production index—is no more than 0.6. For example, 70 t pig iron are produced per hour in the melt-down vessel with an average weight of the iron smelt of 120 t described in German patent no. 33 18 005. This results in a production index of 0.58. The "average weight of the iron smelt in the melt-down reactor" refers here to the arithmetic mean of the weight of the smelt in the melt-down vessel before and after the tapping of a batch or partial amount. With the method according to the invention one can attain production indices of more than 0.8, preferably of more than 1.0.

Although the method according to the invention already has a surprisingly high productivity and considerable economic advantages in the described combination with three process units, it is within the scope of the invention to add further process units, possibly including existing facilities and external utilization of the gas, to the combination process. Thus, process unit B can be designed as a multistage fluid bed or comprise two separate facilities of the same or a different type. For example, it is possible to combine a rotary tubular furnace with a circulating fluid bed. It may be advantageous to operate process unit C, not with one circulating fluid bed, but with two circulating fluid bed facilities which largely work separately. It is then possible to adjust a higher afterburning rate in the first circulating fluid bed, i.e. to exploit the chemical energy of the added coal further. The high degree of metalization of the ore can then be reached in the second circulating fluid bed. With this additional process unit, namely the second circulating fluid bed following the actual process unit C, advantages result for the energy balance of the combination process since the coal consumption is about 20% lower.

A recommendable form of the inventive method intended to increase the productivity and, if possible, to lower the energy required, i.e. the coal consumption, results from a temperature increase of the hot air both for the coal combustion and for the afterburning of the reaction gases. Hot air is normally produced with a temperature of at most 1200° C. With the waste gases from known smelting reduction processes which are customarily utilized as fuel for preheating the air it is not possible to increase the hot air temperature further without adding high-energy gas. The use of the high-energy waste gas from process unit C readily permits hot air temperatures up to approx. 1400° C. to be obtained. The heater assembly for the air can be, for example, a so-called pebble heater as described by German patent no. 38 41 708.

A further advantageous form of the inventive method with the same objective as stated above is achieved by oxygen enrichment of the hot air. The oxygen enrichment of the hot air can take place up to oxygen contents of 50%. However, very much lower oxygen enrichments, for example up to oxygen contents of 25%, have also proved to be surprisingly favorable.

A particularly advantageous form of the inventive method can be obtained with the combination the two lastmentioned improvements, i.e. the temperature increase of the hot air with a simultaneous increase in its oxygen content. For example, with hot air temperatures of 1350° C. and an additional increase in the oxygen content to approx. 25%, approx. 50 kg coal were saved when producing 1 t liquid pig iron, and the productivity in the melt-down reactor increased in an unforeseeable way by approx. 40%.

Finally, it is within the scope of the invention to meet the energy requirements in the individual process units partly by supplying physical heat, for example by introducing highly heated, inertly behaving gases. One can use different gases with temperatures from 900° to 1600° C., preferably from 1200° to 1400° C. For example, the recycled, fully burned waste gas from process unit B, carbon dioxide and nitrogen, has proved to be useful. The application of these hot gases to supply heat is of course not limited to the stated types of gas; one can use comparable gases and any mixtures thereof.

The method according to the invention is extremely flexible in the selection of fuels. Solid, liquid and gaseous fuels can be processed singly or in mixtures. Any coal qualities, from gas flame coals to anthracite, can be used as well as problematic burnable residues from graphite and aluminum production. One can also use refinery residues, all heavy oil qualities, any types of oil including diesel oil and domestic fuel. Of the gaseous fuels, natural gas, methane, ethane, propane, butane and mixtures thereof have proved to be suitable.

BRIEF DESCRIPTION OF THE DRAWING

The invention shall now be explained in more detail with reference to a schematic drawing and to various examples for application.

DETAILED DESCRIPTION OF THE PREFERRED EMBODIMENT

Figure 1B:
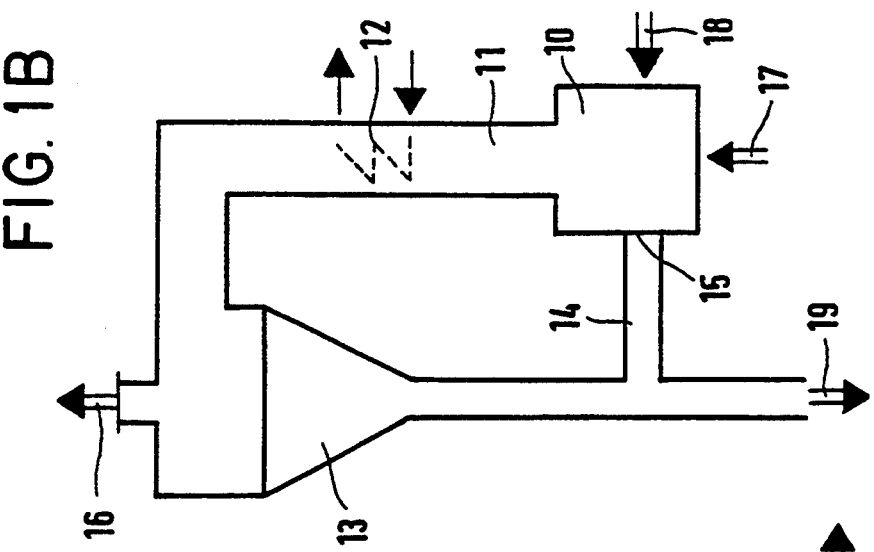
FIG. 1 shows a schematic representation of the inventive combination process for smelting reduction of metal ore with the at least three process units.
Figure 1A:
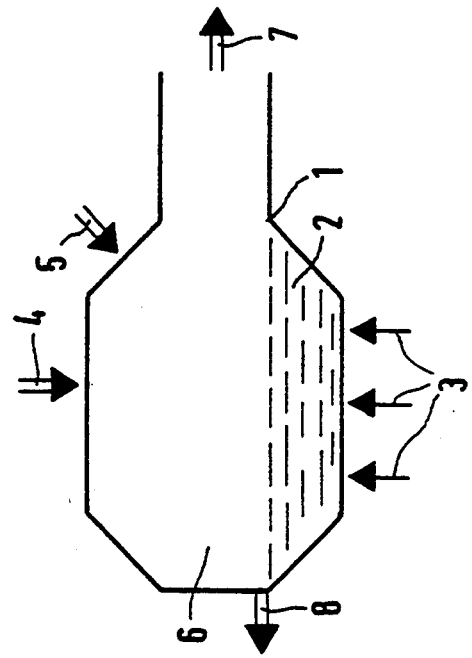
Figure 1C:
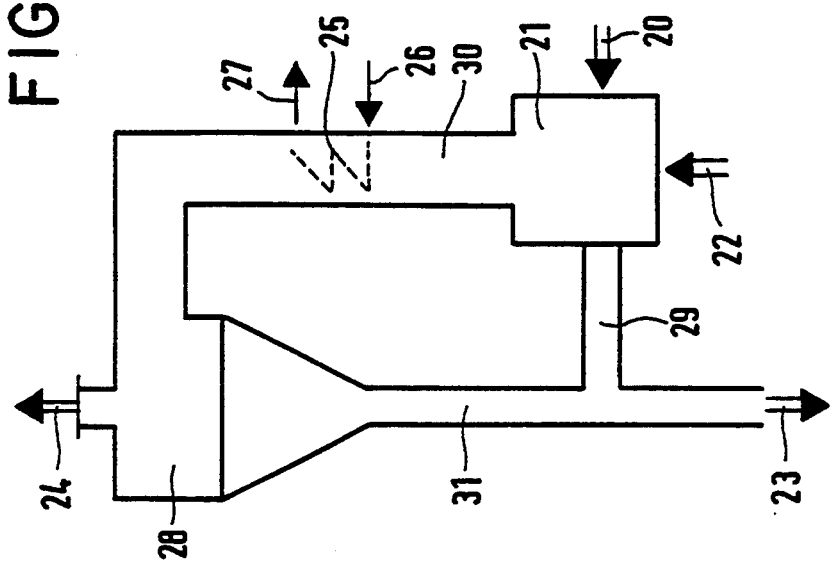

Process unit A comprises the melt-down reactor, which has a refractory lining (not shown) and contains molten bath 2. The reacting agents are blown into gas space 6 of meltdown reactor 1 through bottom tuyères 3, supply means 4 above the bath surface and top blowing tuyère 5 for the oxygenous gas, preferably hot air. The reaction gases emerging from smelt 2 react in gas space 6 with the oxygen of the hot air from tuyère 5, and the thereby liberated heat is transferred to smelt 2 with an efficiency of over 80%. The resulting waste gas leaves melt-down reactor 1 through the waste-gas opening symbolized by arrow 7. The produced molten bath and the slag leave melt-down reactor 1 through outlet 8.

Process unit B, or the preheating and initial reduction facility, comprises a circulating fluid bed with mixing chamber 10, riser pipe 11 containing heat exchanger 12 for the steam generation, and cyclone 13 with solids return pipe 14 and discharge 15. Via inlet 17 the waste gas passes from process unit A into mixing chamber 10 of process unit B. The hot air for afterburning the introduced gases and for the ores and the slag forming agents to be calcined is introduced into mixing chamber 10 via opening 18. The waste gas leaves this process unit via opening 16. Outlet 19 is intended for the preheated solids which are conveyed pneumatically from there to process unit C.

Through injection port 20 all solids pass into mixing chamber 21 of process unit C. These solids are the heated and initially reduced metal ores, the calcined and heated slag forming agents, the coal and the conveying gas required for the pneumatic transport. Via injection port 22 in mixing chamber 21 the oxygenous gases, usually hot air, is supplied for combustion, preferably partial combustion, of the coal introduced into mixing chamber 21. Through outlet 23 the solids from process unit C, i.e. mainly the metal ores selectively reduced to a high degree of metalization as well as the slag forming agents and the coke, pass into the melt-down reactor, i.e. process unit A. The relatively high-energy waste gas from process unit C is supplied via waste-gas opening 24 to the consumers, for example the burners of the pebble heater for the hot air production.

The operation of process unit C and analogously of process unit B, since in this example this is also a circulating fluid bed, is basically as follows. The solids are supplied to mixing chamber 21 through opening 20 and solids return pipe 29 and partly burned therein by the oxygenous gases flowing in through injection port 22. A fluid bed is produced from the gas and the solids, which rises in riser pipe 30 containing cooler 25. Cooler 25 is fed with water via inlet 26 and the resulting steam escapes via outlet 27. The fluid bed then enters cyclone 28 tangentially, and the waste gas largely liberated from the solids here in cyclone 28 leaves the latter via waste-gas opening 24. One part of the solids passes via solids pipe 31 and outlet 23 to the melt-down reactor and another part flows via solids return pipe 29 back into mixing chamber 21. The solids stream is divided by control valves (not shown), for example slides or discharge means such as cellular wheel sluices. From the mixing chamber the solids stream recirculates through the facility as described.

Here are several examples to explain the inventive method in more detail. All numerical data stated in the examples relate to the production of one metric ton of liquid pig iron from a high-quality iron ore, e.g. a typical Australian ore. The melt-down reactor and thus also the pig iron production are selected so as to be relatively small in the examples and correspond approximately to a pilot plant in which the weight of the smelt in the melt-down reactor is about 15 t on the average.

The ore prereduction, i.e. process units B and C, are designed as circulating fluid bed facilities, for example of the Fluxflow type.

The first example is for the sake of comparison and describes the known method comprising a smelting reduction vessel with an ore prereduction stage, as published e.g. for the HIsmelt process.

Approx. 700 kg coal and approx. 150 kg recycled dust are supplied to the smelting reduction vessel via the bottom tuyères and 1700 kg ore with a degree of prereduction of 20% and a temperature of 900° C. above the bath surface. For afterburning, approx. 2800 Nm$^3$ hot air with a temperature of 1200° C. is blown into the gas space above the smelt. From the smelting reduction vessel, 3700 Nm$^3$ waste gas with a temperature of 1700° C. and a degree of afterburning of 50% flows into the ore prereduction stage, a circulating fluid bed, which is charged with 350 kg slag forming agents and 1600 kg ore. The amount of waste gas from this facility is 2300 Nm$^3$ with a temperature of 900° C. and a degree of afterburning of 70%. The thermal value is approx. 0.35 Mcal. With this known process one can obtain a maximum production rate of 7 t per hour, corresponding to a production index of 0.47, the resulting amount of slag being approx. 400 kg/t pig iron.

With the inventive method, by contrast, one can obtain in the same melt-down reactor a production of approx. 13 t per hour and thus a production index of 0.87. Via bottom tuyères 3 encased with protective medium one introduces into melt-down reactor 1 approx. 100 kg coal and the recycled dust from the total plant of approx. 250 kg together with the necessary carrier gas. Via supply means 4, 250 kg coke, approx. 1300 kg prereduced ore with a degree of prereduction of 65% and a temperature of 950° C. pass into smelt 2 of melt-down reactor 1. For afterburning the reaction gases from smelt 2, approx. 1550 Nm$^3$ hot air with a temperature of 1200° C. is blown into gas space 6 through afterburning tuyère 5. Through waste-gas opening 7 approx. 2000 Nm$^3$ waste gas with a temperature of approx. 1700° C. and a degree of afterburning of approx. 60% passes via inlet 17 into mixing chamber 10 of the preheating and initial reduction facility. This process unit B is additionally supplied via the inlet port with 350 kg slag forming agent, 1500 kg ore and approx. 450 Nm$^3$ hot air. The amount of waste gas from this process unit B is 2500 Nm$^3$ with a temperature of 900° C., and it is fully burned, i.e. it has a degree of afterburning of 100%. This waste gas flows out of opening 16 to the end-users which utilize the physical heat of the gas.

From this process unit B, 1600 kg slightly prereduced ore with a degree of prereduction of 11% and a temperature of 900° C. passes via outlet 19 into the circulating fluid bed of process unit C. One additionally supplies facility C with 500 kg coal and 300 Nm$^3$ hot air. The amount of waste gas from this facility is 800 Nm$^3$ with a temperature of 950° C., a degree of afterburning of 30% and a thermal value of 1.2 Mcal/Nm$^3$. From this partial reduction facility the amounts of ore and slag forming agent stated at the beginning of the example are supplied to the melt-down reactor.

In a typical example of the inventive method the production is approx. 15 t/h, corresponding to a production index of 1.0. Passing from the partial reduction facility (process unit C) into the melt-down reactor are 250 kg coke, 1300 kg prereduced ore with a degree of prereduction of 65%, a temperature of 950° C. and a proportion of carrier gas of 60 Nm$^3$. In addition, 90 kg coal and about 250 kg recycled dust flow through the bottom tuyères. For afterburning the reaction gas one uses 1500 Nm³ hot air with a temperature of 1200° C. in the melt-down reactor. The amount of waste gas of about 1800 Nm³ with a degree of afterburning of 70% and a temperature of 1700° C. flows into the fluid bed of the preheating and initial reduction facility (process unit B). This facility is also charged with 340 kg slag forming agents, 1540 kg ore and 270 Nm³ hot air. Escaping from process unit B is 2300 Nm³ fully burned waste gas (degree of afterburning 100%) with a temperature of 900° C. As already explained, this waste gas is supplied to any desired end consumer to utilize the physical heat.

In the partial reduction facility (process unit C) a high-quality reducing gas is produced from 540 kg coal and 660 Nm³ hot air to reduce the 1600 kg ore with a temperature of 900° C. and a degree of prereduction of 11%, which has been transferred from process unit B to process unit C, to the aforesaid degree of prereduction (65%). Escaping from process unit C is 1200 Nm³ high-energy waste gas with a temperature of 950° C., a degree of afterburning of 38% and a thermal value of 0.9 Mcal/Nm³. This gas can be utilized for example to heat the amount of hot air for the inventive combination process in a pebble heater.

Finally, a third example which utilizes the particularly advantageous form of the inventive method, namely an elevated hot air temperature with simultaneous oxygen enrichment of the hot air, shows the following thermal and quantity balance. The smelt in the melt-down reactor is supplied below the bath surface with approx. 50 kg coal and approx. 100 kg recycled dust with the customary amounts of carrier gas. Above the bath surface, 1400 kg partly reduced ore with a degree of prereduction of 65% and 900° C. passes into the smelt. For afterburning one uses approx. 1000 Nm³ hot air with a temperature of 1350° C. and an oxygen content of 24.5%. The amount of waste gas from process unit A which is supplied to process unit B is 1260 Nm³ with a temperature of 1720° C. and a degree of afterburning of 66%. Process unit B is charged with approx. 1540 kg ore, 330 kg slag forming agent and approx. 190 Nm³ hot air, likewise with 1350° C. and 24.5% oxygen. From process unit B, 1680 Nm³ fully burned waste gas with a temperature of 900° C. escapes. From this preheating and initial reduction facility, 1640 kg ore with a degree of prereduction of 11% and a temperature of 900° C. passes into the circulating fluid bed of process unit C together with 530 kg coal and 530 Nm³ hot air. The amount of waste gas from this partial reduction facility is 1100 Nm³, and the waste gas has a temperature of 950° C., a degree of afterburning of 40% and a thermal value of 0.9 Mcal/Nm³.

In this example there was an extremely high production rate of approx. 20 t per hour operating time, corresponding to a production index of 1.33.

The method according to the invention, which makes it possible to partly reduce metal ores selectively to a certain degree of metalization in a combination process comprising at least three process units and to reduce them completely to metal in a melt-down reactor with unprecedented productivity, is characterized by high flexibility. It can be integrated advantageously into existing metallurgical factories, e.g. a steel mill, and adapted in a favorable way to the various production conditions. As already explained above, both the preheating and initial reduction facility and the actual partial reduction facility can be of one- or multistage construction. A fourth process unit, for example for simultaneously supplying an accordingly designed melt-down reactor, can also be added to the combination process along with the three process units mainly described.

Due to the separate waste-gas streams from process units B and C according to the invention it may also prove expedient for certain applications to interrupt the flow of material between these two process units wholly or partly. It is conceivable to put part, or the total amount, of the dried and initially reduced metal ores produced in intermediate storage for a certain time. This procedure is unfavorable in terms of the energy balance but may be useful for adapting the combination process to existing ways of production and is therefore within the scope of the invention.

It is also within the customary framework of expedient reorganization of the combination process to modify and vary the flow of material in the individual process units in accordance with operational experiences. These practical adaptations and advantageous developments are likewise within the scope of the method according to the invention.

I claim:

1. A method for smelting reduction of metal ore comprising:

an initial reduction step in which a metal ore composition is reduced in an initial reduction process unit;

a partial reduction step in which the metal ore composition is further reduced in a partial reduction process unit;

feeding the further reduced metal ore composition from the partial reduction process unit to a melt-down reactor;

and then completely reducing the metal ore composition to metal in said melt-down reactor, a different waste gas being produced in each of the initial reduction process unit, the partial reduction process unit and the melt-down reactor, the waste gas from the melt-down reactor being passed into the initial reduction process unit, where said waste gas from the melt-down reactor is fully burned and then removed from the combination process.

2. The method of claim 1, wherein the initial reduction process unit and the partial reduction process unit are of multistage construction.

3. The method of claim 1, wherein said melt-down reactor has a gas space in which reaction gases collect, and said method further comprises afterburning said reaction gases in said gas space in said melt-down reactor with oxygenous gases with a degree of afterburning of 50 to 80%.

4. The method of claim 1, wherein the metal ore is heated and prereduced with a degree of prereduction of 0 to 30% in the initial reduction process unit.

5. The method of claim 1 further comprising adding slag forming agents in the initial reduction process unit.

6. The method of claim 1, wherein said metal ore composition is supplied from the initial reduction process unit to the partial reduction process unit and further reduced in the partial reduction process unit with surplus coal.

7. The method of claim 6, wherein coal is supplied to said partial reduction process unit, and part of said coal is burned in the partial reduction process unit and volatile components are liberated from the other part of said coal in the partial reduction process unit.

8. The method of claim 1, wherein said metal ore composition is selectively prereduced to a degree of metalization from 30% to 70% in the partial reduction process unit.

9. The method of claim 1, wherein the partly reduced ores, the coke and the slag forming agents are supplied in a heated state from the partial reduction process unit to the melt-down reactor.

10. The method of claim 1, wherein oxygen, air, and/or oxygen-enriched air are supplied to the initial reduction process unit, the partial reduction process unit and the melt-down reactor.

11. The method of claim 10, characterized in that the oxygen-enriched gases, wherein the oxidizing gases, are preheated to temperatures from 1000° C. to 1600° C.

12. The method of claim 11, wherein the production index, defined as the production rate of the molten bath in tons per hour, based on the average weight of the smelt in the melt-down vessel in tons, is set to be greater than 0.8.

13. The method of claim 5, wherein said slag forming agents comprise limestone and/or flux.

14. The method of claim 8, wherein said degree of metalization is from 35 to 65%.

15. The method of claim 11, wherein said oxidizing gases are preheated to from 1200° to 1400° C.

16. The method of claim 12, wherein said production rate is set to be greater than 1.0.

* * * * *